March 3, 1970 W. J. VAN KERKVOORT ET AL 3,498,104
AUTOMATIC POUR POINT ANALYZER
Filed Aug. 3, 1966
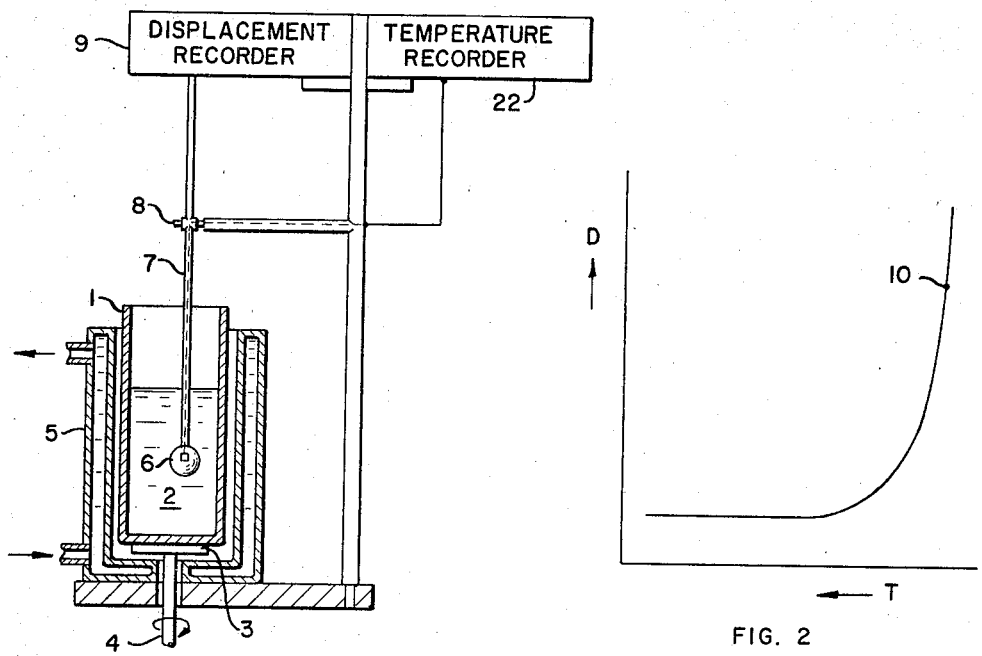
FIG. 1
FIG. 2
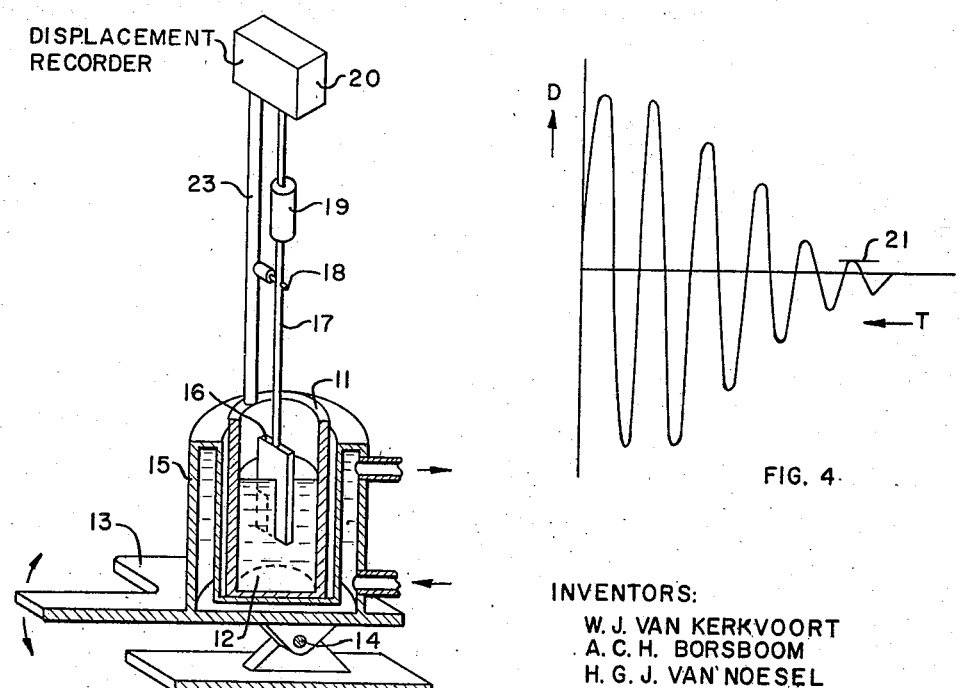
FIG. 3
FIG. 4
INVENTORS:
W. J. VAN KERKVOORT
A. C. H. BORSBOOM
H. G. J. VAN NOESEL
BY:
THEIR ATTORNEY

# United States Patent Office 3,498,104
Patented Mar. 3, 1970

3,498,104
AUTOMATIC POUR POINT ANALYZER
Willem J. van Kerkvoort, Albertus C. H. Borsboom, and Henricus G. J. van Noesel, Amsterdam, Netherlands, assignors to Shell Oil Company, New York, N.Y., a corporation of Delaware
Filed Aug. 3, 1966, Ser. No. 569,919
Claims priority, application Netherlands, Aug. 6, 1965, 6510270
Int. Cl. G01n 25/02
U.S. Cl. 73—17
5 Claims

ABSTRACT OF THE DISCLOSURE

A method and apparatus for determining the pour point of a liquid wherein a sample is placed in a container, a body at least partially immersed in the container and the container and sample being moved relative to the body. The displacement of the body is measured to determine the pour point of the liquid.

---

The invention relates to an apparatus for the determination of the pour point of a liquid, such as oil, mineral oil and, in particular, to a method and apparatus for determining a temperature related to the pour point.

A method for the determination of the pour point of liquids is precisely described in the ASTM method D–97. In this method a sample of the liquid to be tested is placed in a container and cooled at a specific rate, from a higher temperature. By periodically tilting the container, the mobility of the liquid can be observed, from which the pour point can be derived in a specified manner. This method, which is carried out manually, is time consuming and expensive.

In the British patent specification No. 910,914 an apparatus and a process have been described by which a determination of the pour point can to a large extent be done automatically. The method is based on the observation, with the aid of a light beam and a photocell, of the mobility of the surface of the liquid when the liquid is moved. An important disadvantage of this method is that no reliable results are obtained if the viscosity of the liquid rises above 300 centistokes (cs.) before the pour point has been reached, which greatly limits the field of application.

The present invention provides a means by which the field of application of the above system is considerably extended. According to the invention a body is, at least partly, immersed in the liquid, the body being suspended in such a way that it is capable of moving in at least one direction between specific limits. In addition the liquid and the body can be moved relatively to each other in such a way that a force is generated which partly determines the deflection of the body. Also, means are provided for making measurements of the position of the body, from which measurements the pour point of the liquid can be derived.

The force which is exerted on the body by the liquid depends on the viscosity of the liquid. If the temperature of the liquid drops to a value relatively near to the pour point, then the liquid will exert a larger force on the body than would be expected for the liquid on the basis of a normal rise in viscosity at decreasing temperature. This anomaly in the force on the body gives rise to an anomaly in the position of the body, which can be determined with great accuracy. It is possible for a good measurement to be made even if the viscosity at the pour point is 300,000 cs.

A suitable embodiment of the apparatus according to the invention is obtained if the container holding liquid is cylindrical and capable of rotating about the center line, the body being suspended from a fixed point outside the container in such a way that it is displaced from the center line. In this way a continuous measurement during the test is possible, which increases the accurary of the determination as compared with an intermittent operating apparatus. The rate of rotation may be low, for instance once every ten minutes.

The body may be a sphere located at the end of a rigid arm and entirely immersed in the liquid, while means are available for making measurements of the position of that arm relative to its point of suspension. Naturally, this position depends on the position of the sphere. The deflection of the arm relative to its rest position is determined by the equilibrium between the force exerted by the liquid on the sphere—and on that part of the arm which is immersed in the liquid—and a component of gravity. Accordingly, as the viscosity of the liquid increases with decreasing temperature, the deflection of the arm and sphere will increase. When the pour point is being approached, that deflection increases at a faster rate than is expected. From this the pour point can be derived. The deflection of the arm may, for instance, be measured electro-optically on an extension thereof beyond the point of suspension by means of a photo-sensitive resistor. The temperature of the liquid can be measured by means of a thermocouple whose junction is attached to the sphere.

Another suitable embodiment is obtained if the container holding the liquid is capable of periodically and partly rotating about a horizontal shaft, the body being suspended from the holder. The body may be a flat plate which is located at the end of a rigid arm and partly immersed in the liquid. The plate is placed in a vertical position and parallel to the axis of rotation of the container, while the arm on which the plate is mounted is positioned in such a way that the center of gravity of the plate lies below the point of suspension a distance approximately one tenth of the length of the arm. Also, means are provided for making measurements of the position of that arm relative to its point of suspension.

The above advantages of the invention will be more easily understood from the following description of the two embodiments when taken in conjunction with the attached drawing in which:

FIGURE 1 is a vertical section of the embodiment using a sphere;

FIGURE 2 is a plot of the deflection versus temperature for the apparatus of FIGURE 1;

FIGURE 3 is a vertical section of an embodiment using a flat plate;

FIGURE 4 illustrates the deflection versus temperature for the apparatus of FIGURE 3; and FIGURE 1 diagrammatically represents an embodiment where the container during the cooling is rotated about its center line. The liquid 2 to be tested is placed in the container 1. The container is mounted on a base 3, with the shaft 4 being connected to the base. The shaft 4 is driven by a motor to provide a constant speed of rotation for the container 1. The container with its contents is cooled with the aid of a cooling jacket 5. A sphere 6 is suspended on a rigid arm 7 which is capable of rotating about a shaft 8. In box 9 is contained the equipment for measuring the position of the terminal end of the rigid arm 7. The measuring equipment generates an electric signal which is a measure of that position, which signal can be read and/or recorded. The measuring means may be any device capable of measuring displacement, for example a strain gauge or displacement transformer. Also, pneumatic detecting means may be used to measure the displacement of the shaft supporting the sphere 6. At the surface of the sphere 6 is located the junction of a thermocouple whose wires are passed to a measuring circuit 10 via the pivot 8. The temperature is continuously read and/or recorded by the temperature measuring circuit 22.

FIGURE 2 shows an example of a plot of the measurements made with the apparatus according to FIGURE 1. The information of FIGURE 2 may be hand plotted or may be plotted automatically by combining the measurements of recorders 9 and 22 and supplying them to an x–y recorder. Along the horizontal axis is plotted the temperature of the liquid at the surface of the sphere, decreasing from left to right. Along the vertical axis is plotted the deflection of the arm in an arbitrary unit of measure. At a certain moment this deflection starts to rapidly increase. When a specific deflection is reached, it may be said that the pour point has been reached. In FIGURE 2 this is indicated by point 10. The temperature coresponding to this point is then the pour point. The choice of this point can be made on the basis of a correlation measurement according to the method ASTM D–97. Naturally, it is possible to apply a correction to the point observed.

FIGURE 3 diagrammatically represents a second embodiment where the container 11 is periodically tilted during the cooling. The table 13, which supports the container 11, is capable of tilting about the shaft 14. A drive means (not shown) is provided for tilting the container 11, for instance, by use of a rotating disc with a cam, which engages the end of table 13. The container with contents is cooled by jacket 15 through which a suitable coolant is circulated. A flat plate 16 is largely immersed in the liquid 12. This plate is attached to a rigid arm 17 which is capable of rotating about a shaft 18. The other end of the arm 17 carries a counterweight 19 which may be movable. With the aid of the counterweight the arm and plate can be placed in equilibrium in such a way that its center of gravity is just below the shaft 18. The box 20 again contains the equipment for measuring the position of the extreme end of the arm 17. The box 20 and the pivot 18 are connected via the rigid arm 23 to the container 11. The junction of a thermocouple is placed on the surface of the plate and immersed in the liquid to provide a means for determining the temperature of the oil.

FIGURE 4 represents an example of a plot of the measurements obtained with the aid of the apparatus according to FIGURE 3. Plotted along the horizontal axis is the temperature of the liquid at the surface of the plate, decreasing from left to right. Plotted along the vetrical axis is the deflection of the arm in an arbitrary unit of measure. When, at the beginning of the test, the temperature is high, the deflection is at maximum while at a certain moment this deflection starts to decrease rapidly. When a specific deflection is reached, it may be said that the pour point has been reached. In FIGURE 4 this is indicated by point 21. The temperature corresponding to this point is then the pour point. The choice of this point can be made on the basis of a correlation measurement according to the method ASTM D–97. Naturally, it is possible to apply a correction to the point observed.

During the cyclic tilting of the container 11 holding liquid, the liquid will, as long as the viscosity is not excessively high, move in the container in such a way that the surface remains horizontal. When the viscosity value increases as a result of cooling, the movement of the liquid will proceed more slowly. When the pour point is being approached, that movement decreases faster than would be expected. The body in the first instance follows the movement of the liquid and, consequently, from the position of the body the pour point may in turn be derived. If the body is suspended from the holder, then the deflection of the arm when the container is being tilted decreases with increasing viscosity of the liquid. Thus, the approach of the pour point is derived from an anomaly in a gradual change of small values of the deflection.

If the body is suspended from a fixed point outside the container, the deflection of the arm when the container is tilted increases at increasing viscosity of the liquid.

Application of a flat plate which is not entirely immersed ensures a large effect of the moving liquid on the plate. During the initial tilting the liquid at and near the surface will be moving. Since the supporting arm 17 and the plate are counterbalanced, it is ensured that the liquid will exert only a small force on the plate to cause that plate to follow the movement of the liquid. As a result, there will occur only a slight stirrer action by the plate in the liquid, particularly if the plate is suspended from the holder. Full counterbalancing has the disadvantage that the plate does not of itself return to the original position when the container returns to the original position. Therefore, a slight unbalance is desirable in order that a gravity effect may be present in the system.

Other embodiments of the apparatus according to the invention are obtained with constructions where the container holding the liquid is standing still and the body is moved, for instance along a circular path around the center line of the container, or along a straight path in a backward and forward movement. It is also possible for the container to be moved backwards and forwards on a horizontal plane along a straight path while the body is standing still.

Cooling of the container holding liquid may take place by a cold liquid circulating through a jacket, which jacket largely surrounds the container. It is likewise possible to employ the Peltier effect with electric elements. The rate of cooling can be controlled manually or automatically.

In the examples drawn, the container has a shape approximately similar to that of the container according to the ASTM specification. It has been found that the shape may also be chosen to be different without this influencing the measuring results.

Examples of results obtained with an apparatus constructed according to the invention and equipped with a liquid container rotating about its center line are compared with pour points determined separately according to the method ASTM D–97 as follows:

| Oil | Pour point in °C; apparatus according to the invention | Pour point in °C. according to ASTM D–97 |
| --- | --- | --- |
| Gas oil 1 | +7 | +8 |
| Gas oil 2 | −1 | 0 |
| Gas oil 3 | −1 | −1 |
| Cracked oil 1 | −7 | −6 |
| Cracked oil 2 | −7 | −8 |
| Lubricating oil | −8 | −9 |
| Mixed oil | −17 | −16 |

The highest viscosity reached at the pour point concerned amounted to approximately 300,000 cs.

Agreement with the values determined according to the method ASTM D–97 is good and reproducibility of the measurements is better than 1°.

We claim as our invention:

1. An apparatus for determining the pour point of a liquid such as oil, where a sample of the liquid is disposed in a container and cooled from a temperature higher than the temperature being determined, said apparatus comprising:
   a body, said body being at least partly immersed in the liquid;
   a rigid support means, said body being fixedly attached to said support means at a point outside said container to permit movement in at least one direction between specific limits, said body in addition being displaced from the central axis of the container;
   moving means, said moving means being operably associated with the container to rotate the container about its central axis to deflect the body;
   measuring means, said measuring means being operably associated with said support means to detect and measure the displacement of said body; and temperature-measuring means, said temperature-sensing means being associated with said body to measure the surface temperature of the body.

2. The apparatus of claim 1 wherein the body is a sphere disposed at the end of a rigid arm and completely immersed in the liquid.

3. The apparatus of claim 1 wherein the body is a flat plate suspended at the end of a rigid arm, said rigid arm being mounted on a horizontal pivot and counterbalanced, the center of gravity of the combination of the arm and plate being below the pivot point of the arm and said moving means rotating said container about an axis to impart a motion to the container substantially normal to the plane of said flat plate.

4. A method for determining the pour point of a liquid comprising:
   placing the liquid in a closed-end tubular container;
   suspending in the liquid a body having a rigid member attached thereto and, pivotally supporting the member above the liquid;
   lowering the temperature of the liquid;
   oscillating the container about a horizontal axis during the cooling of the liquid to produce a force that tends to deflect the rigid member supporting the body; and
   measuring the position and surface temperature of the body.

5. The method of claim 4 wherein the liquid is placed in a cylindrical container.

References Cited

UNITED STATES PATENTS

| | | | |
|---|---|---|---|
| 2,382,979 | 8/1945 | Demb | 73—59 |
| 2,410,385 | 10/1946 | Loukomsky et al. | 73—59 |
| 2,423,687 | 7/1947 | Davis et al. | 73—17 |
| 2,437,194 | 3/1948 | Harrington | 73—17 XR |
| 2,903,882 | 9/1959 | Hulbert | 73—17 |
| 3,077,764 | 2/1963 | Kapff | 73—17 |

JAMES J. GILL, Primary Examiner